US012783313B2

(12) United States Patent
Li et al.

(10) Patent No.: US 12,783,313 B2
(45) Date of Patent: Nov. 3, 2026

(54) APPARATUS AND METHOD OF PROCESSING DATA, ELECTRONIC DEVICE, AND STORAGE MEDIUM

(71) Applicant: Kunlunxin Technology (Beijing) Company Limited, Beijing (CN)

(72) Inventors: Runze Li, Beijing (CN); Shiyu Zhu, Beijing (CN); Baoyu Zhou, Beijing (CN)

(73) Assignee: KUNLUNXIN TECHNOLOGY (BEIJING) COMPANY LIMITED, Beijing (CN)

( * ) Notice: Subject to any disclaimer, the term of this patent is extended or adjusted under 35 U.S.C. 154(b) by 407 days.

(21) Appl. No.: 18/520,646

(22) Filed: Nov. 28, 2023

(65) Prior Publication Data

US 2024/0126610 A1 Apr. 18, 2024

(30) Foreign Application Priority Data

Mar. 31, 2023 (CN) ......................... 202310341253.4

(51) Int. Cl.
*G06F 9/50* (2006.01)

(52) U.S. Cl.
CPC .......... *G06F 9/5038* (2013.01); *G06F 9/5016* (2013.01); *G06F 9/5044* (2013.01)

(58) Field of Classification Search
CPC .... G06F 9/5038; G06F 9/5016; G06F 9/5044; G06F 2209/506; G06F 2209/508;
(Continued)

(56) References Cited

U.S. PATENT DOCUMENTS 12,299,496 B1 * 5/2025 Tanase ................ G06F 16/9024
2020/0125508 A1 * 4/2020 Liu ....................... G06F 3/0611
(Continued)

FOREIGN PATENT DOCUMENTS

CN 112631754 4/2021
CN 113360266 * 9/2021
(Continued)

OTHER PUBLICATIONS

Office Action issued in corresponding Japanese Patent Application No. 2023-206152, dated Apr. 9, 2025.
(Continued)

*Primary Examiner* — Sisley N Kim
(74) *Attorney, Agent, or Firm* — Pillsbury Winthrop Shaw Pittman, LLP

(57) ABSTRACT

An apparatus and a method of processing data, an electronic device, and a storage medium are provided, which relate to a field of artificial intelligence, and in particular to fields of chip and multi-thread parallel technologies. The apparatus includes: a first target storage unit; and a processor configured to: determine an initial number of threads according to a data amount of target data and a capacity of the first target storage unit in response to determining that the data amount is less than or equal to the capacity of the first target storage unit, where the target data includes input data to be processed, weight data to be processed, and output data; and determine a first number of executable tasks according to the initial number of threads in response to determining that the initial number of threads is greater than or equal to a predetermined number of threads.

20 Claims, 3 Drawing Sheets

(58) Field of Classification Search
CPC ........ G06F 9/5027; G06F 9/38; G06F 9/3885; G06F 9/3009; G06F 9/4806; G06N 3/08; G06N 5/04
See application file for complete search history.

(56) References Cited

U.S. PATENT DOCUMENTS

| | | | |
|---|---|---|---|
| 2021/0149680 | A1 | 5/2021 | Hughes et al. |
| 2022/0051088 | A1 | 2/2022 | Meng |
| 2022/0269548 | A1 | 8/2022 | Dwivedi et al. |

FOREIGN PATENT DOCUMENTS

| | | |
|---|---|---|
| CN | 114648112 | 6/2022 |
| CN | 115357358 | 11/2022 |
| JP | 2007122527 | 5/2007 |
| JP | 2011523141 | 8/2011 |
| JP | 2011215812 | 10/2011 |
| JP | 2014174946 | 9/2014 |
| JP | 2020522824 | 7/2020 |
| JP | 2021018711 | 2/2021 |
| JP | 2021517310 | 7/2021 |
| JP | 2023503024 | 1/2023 |
| KR | 20210044669 | 4/2021 |
| WO | 2017131187 | 8/2017 |
| WO | 2020052358 | 3/2020 |

OTHER PUBLICATIONS

Office Action issued in corresponding Chinese Patent Application No. 202310341253.4, dated Jan. 22, 2026.
Office Action issued in corresponding Korean Patent Application No. 10-2023-0174092, dated Jan. 1, 2026.

* cited by examiner

APPARATUS AND METHOD OF PROCESSING DATA, ELECTRONIC DEVICE, AND STORAGE MEDIUM

This application claims the benefit of priority of Chinese Patent Application No. 202310341253.4 filed on Mar. 31, 2023, the whole disclosure of which is incorporated herein by reference.

TECHNICAL FIELD

The present disclosure relates to a field of artificial intelligence technology, and in particular to a field of chip technology and a field of multi-thread parallel technology. More specifically, the present disclosure provides an apparatus and a method of processing data, an electronic device, and a storage medium.

BACKGROUND

With a development of artificial intelligence technology, it is possible to perform model inference or model training tasks in parallel.

SUMMARY

The present disclosure provides an apparatus and a method of processing data, a device, and a storage medium.

According to an aspect of the present disclosure, an apparatus of processing data is provided, including: a first target storage unit; and a processor configured to: determine an initial number of threads according to a data amount of target data and a capacity of the first target storage unit in response to determining that the data amount of the target data is less than or equal to the capacity of the first target storage unit, where the target data includes input data to be processed, weight data to be processed, and output data; and determine a first number of executable tasks according to the initial number of threads in response to determining that the initial number of threads is greater than or equal to a predetermined number of threads.

According to another aspect of the present disclosure, a method of processing data is provided, including: determining an initial number of threads according to a data amount of target data and a capacity of the first target storage unit in response to determining that the data amount of the target data is less than or equal to the capacity of the first target storage unit, where the target data includes input data to be processed, weight data to be processed, and output data; and determining a first number of executable tasks according to the initial number of threads in response to determining that the initial number of threads is greater than or equal to a predetermined number of threads.

According to another aspect of the present disclosure, an electronic device is provided, including the apparatus of processing the data provided in the present disclosure.

According to another aspect of the present disclosure, an electronic device is provided, including: at least one processor; and a memory communicatively connected to the at least one processor, where the memory stores instructions executable by the at least one processor, and the instructions, when executed by the at least one processor, cause the at least one processor to implement the method provided in the present disclosure.

According to another aspect of the present disclosure, a non-transitory computer-readable storage medium having computer instructions therein is provided, and the computer instructions are configured to cause a computer to implement the method provided in the present disclosure.

It should be understood that content described in this section is not intended to identify key or important features in embodiments of the present disclosure, nor is it intended to limit the scope of the present disclosure. Other features of the present disclosure will be easily understood through the following description.

BRIEF DESCRIPTION OF THE DRAWINGS

The accompanying drawings are used for better understanding of the solution and do not constitute a limitation to the present disclosure, in which.

DETAILED DESCRIPTION OF EMBODIMENTS

Figure 1:
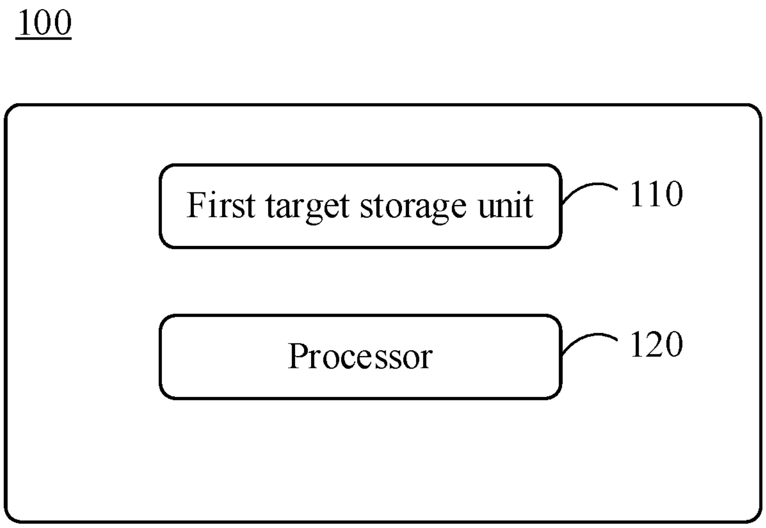
FIG. 1 shows a schematic block diagram of an apparatus of processing data according to an embodiment of the present disclosure.

Exemplary embodiments of the present disclosure will be described below with reference to the accompanying drawings, which include various details of embodiments of the present disclosure to facilitate understanding and should be considered as merely exemplary. Therefore, those ordinary skilled in the art should realize that various changes and modifications may be made to embodiments described herein without departing from the scope and spirit of the present disclosure. Likewise, for clarity and conciseness, descriptions of well-known functions and structures are omitted in the following description.

In a process of performing an inference using a deep learning model, a model inference task may be divided into a plurality of sub-tasks based on a task mapping strategy of Directed Acyclic Grap (DAG). Different sub-tasks may be provided in different task queues, so that the plurality of sub-tasks may be executed in parallel. After an execution of the plurality of sub-tasks is completed, an execution result of the model inference task may be obtained.

The model inference task may be executed using a heterogeneous hardware platform including a central processing unit (CPU) and a graphic processing unit (GPU). A directed acyclic graph may be determined according to an execution relationship information of different tasks, so that a parallel processing capability of the graphic processing unit may be combined with the directed acyclic graph to improve a usage efficiency of a heterogeneous device. For example, the model inference task includes a large number of matrix operations. The graphic processing unit may significantly reduce a time of matrix calculations and improve an execution efficiency of the model inference task.

Resources of the heterogeneous hardware platform may be scheduled based on a dependency between different data. However, for the heterogeneous hardware platform, it is difficult to perform a finer-grained splitting of the model inference task. For example, it is difficult to effectively process large batch sizes of data.

On the heterogeneous hardware platform, the central processing unit may serve as a host end, and the graphic processing unit may serve as a device end. Data may be transmitted from the host end to the device end. For example, the data may be transmitted to a plurality of graphic processing unit cores on the device side, so as to achieve a parallel acceleration of matrix calculations by using the graphic processing unit. The graphic processing unit may include different levels of high-speed dynamic random access memories (DRAM). For example, the graphic processing unit may include a $0^{th}$-level high-speed dynamic random access memory (L0), a $1^{st}$-level high-speed dynamic random access memory (L1), a $2^{nd}$-level high-speed dynamic random access memory (L2), a $3^{rd}$-level high-speed dynamic random access memory (L3), and a $4^{th}$-level high-speed dynamic random access memory (L4). The $4^{th}$-level high-speed dynamic random access memory has a largest capacity. All processor cores may read and write data from the $4^{th}$-level high-speed dynamic random access memory. The $0^{th}$-level high-speed dynamic random access memory to the $2^{nd}$-level high-speed dynamic random access memory have small capacities and are difficult to store weight data or input data of the deep learning model.

A bandwidth of the $3^{rd}$-level high-speed dynamic random access memory may be, for example, twice that of the $4^{th}$-level high-speed dynamic random access memory. In order to fully utilize the capacity and bandwidth of the $3^{rd}$-level high-speed dynamic random access memory, the present disclosure provides an apparatus of processing data, which will be described below.

FIG. 1 shows a schematic block diagram of an apparatus of processing data according to an embodiment of the present disclosure.

As shown in FIG. 1, an apparatus 100 of processing data may include a first target storage unit 110 and a processor 120.

The first target storage unit 110 may be the $3^{rd}$-level high-speed dynamic random access memory.

The processor 120 may be used to: determine an initial number of threads according to a data amount of target data and a capacity of the first target storage unit in response to determining that the data amount of the target data is less than or equal to the capacity of the first target storage unit; and determine a first number of executable tasks according to the initial number of threads in response to determining that the initial number of threads is greater than or equal to a predetermined number of threads.

In embodiments of the present disclosure, the processor may include a plurality of processor cores. The processor may be at least one selected from a graphic processing unit, a neural network processing unit (NPU), or other processors.

In embodiments of the present disclosure, the target data includes input data to be processed, weight data to be processed, and output data. For example, the input data to be processed may be input data of a deep learning model. The weight data to be processed may include weight data of a plurality of operators of the deep learning model. The output data may include output data of the deep learning model.

In embodiments of the present disclosure, it may be determined whether the data amount of the target data is less than or equal to the capacity of the first target storage unit. For example, the data amount of the target data may be 16 megabytes (Mbyte), and the capacity of the first target storage unit may be 64 megabytes. It may be determined that the data amount of the target data is less than the capacity of the first target storage unit. Then, the initial number of threads may be determined to be 4 according to the data amount of the target data and the capacity of the first target storage unit. That is, the first storage unit may store four target data.

In embodiments of the present disclosure, the predetermined number of threads may be 1. If the initial number of threads is 4, it may be determined that the initial number of threads is greater than the predetermined number of threads. The initial number of threads may be used as the first number of executable tasks.

According to embodiments of the present disclosure, during the model training or inference process, in a case of a small data amount, a plurality of target data may be stored in the first target storage unit, so that the bandwidth and capacity of the first target storage unit may be fully utilized, and a data processing efficiency may be improved.

After the number of executable tasks is determined, a same number of tasks as the number of executable tasks may be executed in parallel, which will be further described below.

In some embodiments, the processor 120 may be further used to write a same number of data to be processed as the first number of executable tasks into the first target storage unit. In embodiments of the present disclosure, the data to be processed includes input data to be processed and weight data to be processed. For example, if the first number of executable tasks is 4, then four groups of input data to be processed and weight data to be processed may be written into the first target storage unit.

In some embodiments, the processor 120 may be further used to: execute a same number of tasks as the first number of executable tasks in parallel to obtain a same number of output data as the first number of executable tasks. In embodiments of the present disclosure, the tasks may include processing the input data to be processed by using the weight data to be processed. For example, when the first number of executable tasks is 4, four tasks may be executed in parallel to obtain four output data.

In some embodiments, the processor 120 may be further used to write the same number of output data as the first number of executable tasks into the first target storage unit. For example, four output data may be written into the first target storage unit. According to embodiments of the present disclosure, the input data to be processed stored in the first target storage unit may be processed in parallel, so that the parallel processing capability of the artificial intelligence chip may be fully utilized, and the data processing efficiency may be improved.

It may be understood that the above description is based on an example that the data amount of the target data is less than or equal to the capacity of the first target storage unit, but the present disclosure is not limited thereto, and a further description will be given below.

Figure 2:
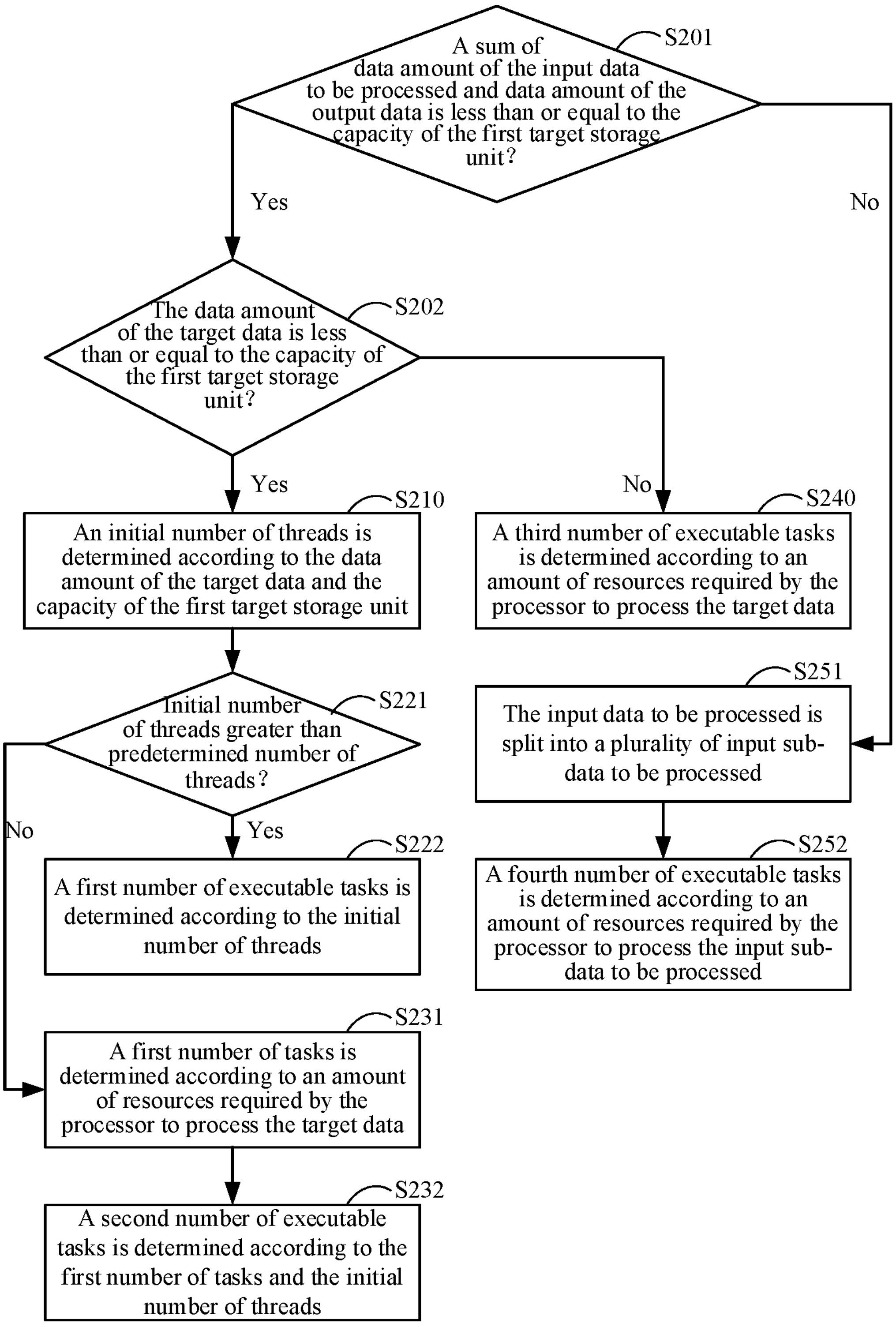
FIG. 2 shows a schematic diagram of an apparatus of processing data according to an embodiment of the present disclosure.

FIG. 2 shows a schematic diagram of an apparatus of processing data according to an embodiment of the present disclosure.

As shown in FIG. 2, the processor may be used to execute at least one instruction to implement operation S201. In operation S201, it is determined whether a sum of a data amount of the input data to be processed and a data amount of the output data to be processed is less than or equal to the capacity of the first target storage unit. For example, taking first target data as an example, a data amount of the first target data is 16 megabytes. The capacity of the first target storage unit may be 64 megabytes. It may be determined that the sum of the data amount of the input data to be processed and the data amount of the weight data to be processed of the first target data is less than the capacity of the first target storage unit, and a further description will be given below in conjunction with operation S202.

In some embodiments, the processor may be further used to execute at least one instruction to implement operation S202 in response to determining that the sum of the data amount of the input data to be processed and the data amount of the output data to be processed is less than or equal to the capacity of the first target storage unit. In operation S202, it is determined whether the data amount of the target data is less than or equal to the capacity of the first target storage unit. For example, it may be determined that the data amount of the first target data is less than the capacity of the first target storage unit.

In embodiments of the present disclosure, the processor may be further used to execute at least one instruction to implement operation S210 in response to determining that the data amount of the target data is less than or equal to the capacity of the first target storage unit. In operation 210, an initial number of threads is determined according to the data amount of the target data and the capacity of the first target storage unit. For example, the initial number of threads may be determined to be 4 according to the data amount of the first target data and the capacity of the first target storage unit. The first storage unit may store four first target data.

Next, in embodiments of the present disclosure, the processor may be further used to execute at least one instruction to implement operation S221. In operation S221, it is determined whether the initial number of threads is greater than a predetermined number of threads. Taking the predetermined number of threads as 1 as an example, if the initial number of threads is 4, it may be determined that the initial number of threads is greater than the predetermined number of threads.

In embodiments of the present disclosure, the processor may be further used to execute at least one instruction to implement operation S222 in response to determining that the initial number of threads is greater than the predetermined number of threads. In operation S222, a first number of executable tasks is determined according to the initial number of threads. For example, the initial number of threads may be used as the first number of executable tasks. The first number of executable tasks may be 4.

It may be understood that the method of determining the number of executable tasks has been described above, and some methods of executing tasks will be described below.

In embodiments of the present disclosure, the processor may be further used to write a same number of data to be processed as the first number of executable tasks into the first target storage unit. For example, the data to be processed may include input data to be processed and weight data to be processed. If the number of first executable tasks is 4, then the input data to be processed and the weight data to be processed of four first target data may be written into the first target storage unit respectively.

In embodiments of the present disclosure, the processor may be further used to execute a same number of tasks as the first number of executable tasks in parallel to obtain a same number of output data as the first number of executable tasks. For example, the tasks may include processing the input data to be processed by using the weight data to be processed. In a case that the first number of executable tasks is 4, four tasks may be executed in parallel to obtain four output data.

In embodiments of the present disclosure, the processor may be further used to write the same number of output data as the first number of executable tasks into the first target storage unit. For example, four output data may be written into the first target storage unit.

It may be understood that the present disclosure has been described above by taking the first target data as an example, and the present disclosure will be further described below by taking second target data as an example. A data amount of the second target data may be 64 megabytes.

In some embodiments, the apparatus of processing the data may further include a second target storage unit, and a capacity of the second target storage unit may be greater than the capacity of the first target storage unit. For example, the second target storage unit may be a global memory (GM) unit or the above-mentioned $4^{th}$-level high-speed dynamic random access memory.

As shown in FIG. 2, the processor may be used to execute at least one instruction to implement operation S201. In operation S201, it is determined whether the sum of the data amount of the input data to be processed and the data amount of the output data to be processed is less than or equal to the capacity of the first target storage unit. For example, the data amount of the second target data may be 64 megabytes, and the capacity of the first target storage unit may be 64 megabytes. The second target data may include input data to be processed, weight data to be processed, and output data. The sum of the data amount of the input data to be processed and the data amount of the output data of the second target data may be less than the capacity of the first target storage unit.

In some embodiments, the processor may be further used to execute at least one instruction to implement operation S202 in response to determining that the sum of the data amount of the input data to be processed and the data amount of the output data to be processed is less than or equal to the capacity of the first target storage unit. In operation S202, it is determined whether the data amount of the target data is less than or equal to the capacity of the first target storage unit. For example, it may be determined that the data amount of the second target data is equal to the capacity of the first target storage unit.

In embodiments of the present disclosure, the processor may be further used to execute at least one instruction to implement operation S210 in response to determining that the data amount of the target data is less than or equal to the capacity of the first target storage unit. In operation 210, the initial number of threads is determined according to the data amount of the target data and the capacity of the first target storage unit. For example, the initial number of threads may be determined to be 1 according to the data amount of the second target data and the capacity of the first target storage unit. The first storage unit may store one second target data.

Next, in embodiments of the present disclosure, the processor may be further used to execute at least one instruction to implement operation S221. In operation S221, it is determined whether the initial number of threads is greater than a predetermined number of threads. Taking the predetermined number of threads as 1 as an example, if the initial number of threads is 1, it may be determined that the initial number of threads is equal to the predetermined number of threads.

In embodiments of the present disclosure, the processor may be further used to execute at least one instruction to implement operation S231 in response to determining that the initial number of threads is less than or equal to the predetermined number of threads. In operation S231, a first number of tasks is determined according to an amount of resources required by the processor to process the target data. For example, first input data to be processed and first weight data to be processed of a first one of the second target data are written into the first target storage unit, and second input data to be processed and second weight data to be processed of a second one of the second target data are written into the second target storage unit. The first input data to be processed and the second input data to be processed may be respectively processed using the processor, so as to determine, based on a test run, the amount of resources required by the processor to process the target data. Subsequently, a plurality of test runs may be performed. In an $i^{th}$ test run, the number of input data to be processed in the second target storage unit may be i. In an $(i+1)^{th}$ test run, the number of input data to be processed in the second target storage unit may be i+1. In an $I^{th}$ test run, the number of input data to be processed in the second target storage unit may be I. If a processor usage is close to 100% in the $I^{th}$ test run, the first number of tasks may be determined to be I. I may be an integer greater than 1, and i may be an integer greater than or equal to 1 and less than I.

In embodiments of the present disclosure, the processor may be further used to execute at least one instruction to implement operation S232. In operation S232, a second number of executable tasks is determined according to the first number of tasks and the initial number of threads. For example, in a case that the first number of tasks is I and the initial number of threads is 1, it may be determined that the second number of executable tasks is I+1. According to embodiments of the present disclosure, in a case of a large data amount, a plurality of target data are stored in the first target storage unit and the second target storage unit respectively, so that the bandwidth of the first target storage unit may be fully utilized and the capacity of the second target storage unit may be fully utilized, which may help to further improve the data processing efficiency.

It may be understood that the method of determining the number of executable tasks has been described above, and some methods of executing tasks will be described below.

In embodiments of the present disclosure, the processor may be further used to write a same number of data to be processed as the initial number of threads into the first target storage unit. The data to be processed includes input data to be processed and weight data to be processed. For example, the input data to be processed and the weight data to be processed of one second target data may be written into the first target storage unit.

In embodiments of the present disclosure, the processor may be further used to write a same number of data to be processed as the first number of tasks into the second target storage unit. For example, the input data to be processed and the weight data to be processed of I second target data may be written into the second target storage unit.

In embodiments of the present disclosure, the processor may be further used to execute a same number of tasks as the second number of executable tasks in parallel to obtain a same number of output data as the second number of executable tasks. The tasks include processing the input data to be processed by using the weight data to be processed. For example, it is possible to execute I+1 tasks in parallel to obtain I+1 output data.

In embodiments of the present disclosure, the processor may be further used to write a same number of output data as the initial number of threads into the first target storage unit. For example, one output data may be written into the first target storage unit, and the output data may correspond to the input data to be processed in the first target storage unit.

In embodiments of the present disclosure, the processor may be further used to write a same number of output data as the first number of tasks into the second target storage unit. For example, I output data may be written into the second target storage unit, and the I output data may respectively correspond to I input data to be processed in the second target storage unit. According to embodiments of the present disclosure, the input data to be processed stored in the first target storage unit and the second target storage unit may be processed in parallel, so that the parallel processing capability of the artificial intelligence chip may be further utilized, and the data processing efficiency may be improved.

It may be understood that the present disclosure has been described above by taking the second target data as an example, and the present disclosure will be further described below by taking third target data as an example. A data amount of the third target data may be greater than 64 megabytes.

As shown in FIG. 2, the processor may be used to execute at least one instruction to implement operation S201. In operation S201, it is determined whether the sum of the data amount of the input data to be processed and the data mount of the output data to be processed is less than or equal to the capacity of the first target storage unit. For example, the data amount of the third target data may be greater than 64 megabytes, and the capacity of the first target storage unit may be 64 megabytes. The third target data includes input data to be processed, weight data to be processed, and output data. The sum of the data amount of the input data to be processed and the data amount of the output data of the third target data may be less than the capacity of the first target storage unit.

In some embodiments, the processor may be further used to execute at least one instruction to implement operation S202 in response to determining that the sum of the data amount of the input data to be processed and the data amount of the output data to be processed is less than or equal to the capacity of the first target storage unit. In operation S202, it is determined whether the data amount of the target data is less than or equal to the capacity of the first target storage unit. For example, it may be determined that the data amount of the third target data is greater than the capacity of the first target storage unit.

In embodiments of the present disclosure, the processor may be further used to execute at least one instruction to implement operation S240 in response to determining that the data amount of the target data is greater than the capacity of the first target storage unit. In operation S240, a third number of executable tasks is determined according to an amount of resources required by the processor to process the target data. For example, taking the third target data as an example, the input data to be processed and the weight data to be processed of three third target data may be written into the second target storage unit. The input data to be processed of the three third target data may be respectively processed using the processor to determine the amount of resources required by the processor to process the third target data. If the processor usage required for the processor to process one third target data is 5%, it may be determined that the third number of executable tasks is 20. It may be understood that the amount of resources required to process a same number of third target data as the third number of executable tasks may not exceed a total amount of resources of the processor. For example, the processor usage required to process the same number of third target data as the third number of executable tasks does not exceed 100%. According to embodiments of the present disclosure, in a case of a large data amount, a plurality of target data are stored in the second target storage unit, so that the capacity of the second target storage unit may be fully utilized, and the data processing efficiency may be improved.

It may be understood that the method of determining the number of executable tasks has been described above, and some methods of executing tasks will be described below.

In embodiments of the present disclosure, the processor may be further used to write a same number of data to be processed as the third number of executable tasks into the second target storage unit. The data to be processed includes input data to be processed and weight data to be processed. For example, in a case that the third number of executable tasks is 20, the input data to be processed and the weight data to be processed of twenty third target data may be written into the second target storage unit.

In embodiments of the present disclosure, the processor may be further used to execute a same number of tasks as the third number of executable tasks in parallel to obtain a same number of output data as the third number of executable tasks. The tasks may include processing the input data to be processed by using the weight data to be processed. For example, twenty tasks may be executed in parallel to obtain twenty output data.

In embodiments of the present disclosure, the processor may be further used to write the same number of output data as the third number of executable tasks into the second target storage unit. For example, twenty output data may be written into the second target storage unit. According to embodiments of the present disclosure, the input data to be processed stored in the second target storage unit may be processed in parallel, so that the parallel processing capability of the artificial intelligence chip may be fully utilized, and the data processing efficiency may be improved.

It may be understood that the present disclosure has been described above by taking the third target data as an example, and the present disclosure will be further described below by taking fourth target data as an example. A sum of the data amount of the input data to be processed and the data amount of the weight data to be processed of the fourth target data may be greater than 64 megabytes.

As shown in FIG. 2, the processor may be used to execute at least one instruction to implement operation S201. In operation S201, it is determined whether a sum of the data amount of the input data to be processed and the data amount of the output data to be processed is less than or equal to the capacity of the first target storage unit. For example, the capacity of the first target storage unit may be 64 megabytes. The sum of the data amount of the input data to be processed and the data amount of the output data of the fourth target data may be greater than the capacity of the first target storage unit.

In some embodiments, the processor may be further used to execute at least one instruction to implement operation S202 in response to determining that the sum of the data amount of the input data to be processed and the data amount of the output data to be processed is greater than the capacity of the first target storage unit. In operation S202, it is determined whether the data amount of the target data is less than or equal to the capacity of the first target storage unit. For example, it may be determined that the data amount of the third target data is greater than the capacity of the first target storage unit.

In embodiments of the present disclosure, the processor may be further used to execute at least one instruction to implement operation S251 in response to determining that the data amount of the target data is greater than the capacity of the first target storage unit. In operation S251, the input data to be processed is split into a plurality of input sub-data to be processed. For example, the input data to be processed of the fourth target data may be input image data to be processed. A shape of the input image data to be processed may be [n, c, h, w]. n may be a batch size, which may indicate a number of images in the input image data to be processed. c may be a number of channels of the image, which may be 3, for example. h may be a height of the image, and w may be a width of the image. The input image data to be processed may be split into a plurality of input image sub-data to be processed according to the batch size of the input image data to be processed. If n is 64, the input image data to be processed may include 64 images. The input image data to be processed may be split into 16 input image sub-data to be processed, and the batch size of each input image sub-data to be processed is 4.

In embodiments of the present disclosure, the processor may be further used to execute at least one instruction to implement operation S252. In operation S252, a fourth number of executable tasks is determined according to an amount of resources required by the processor to process the input sub-data to be processed. For example, the weight data to be processed and three input image sub-data to be processed may be written into the second target storage unit. The three input image sub-data to be processed may be respectively processed using the processor, so as to determine the amount of resources required by the processor to process the input image sub-data to be processed. If the processor usage required for the processor to process one input image sub-data to be processed is 6%, it may be determined that the fourth number of executable tasks is 16. It may be understood that the amount of resources required to process a same number of input image sub-data to be processed as the fourth number of executable tasks may not exceed the total amount of resources of the processor. For example, the processor usage required to process the same number of input image sub-data as the fourth number of executable tasks does not exceed 100%. According to embodiments of the present disclosure, in a case of a larger data amount, the input data to be processed may be split, so that the capacity of the second target storage unit may be fully utilized, and the data processing efficiency may be improved.

It may be understood that the method of determining the number of executable tasks has been described above, and some methods of executing tasks will be described below.

In embodiments of the present disclosure, the processor may be further used to write the weight data to be processed and a same number of input sub-data to be processed as the fourth number of executable tasks into the second target storage unit. For example, the weight data to be processed may be written into the second target storage unit, and 16 input image sub-data to be processed may also be written into the second target storage unit.

In embodiments of the present disclosure, the processor may be further used to execute a same number of tasks as the fourth number of executable tasks in parallel to obtain a same number of output sub-data as the fourth number of executable tasks. The tasks may include processing the input sub-data to be processed by using the weight data to be processed. For example, 16 tasks may be executed in parallel to obtain 16 output sub-data.

In embodiments of the present disclosure, the processor may be further used to write a same number of output sub-data as the fourth number of executable tasks into the second target storage unit. For example, 16 output sub-data may be written into the second target storage unit.

In embodiments of the present disclosure, the processor may be further used to concatenate a plurality of output sub-data into output data. For example, 16 output sub-data may be concatenated into output data corresponding to the input data to be processed. According to embodiments of the present disclosure, in a case of a larger data amount, the data may be split according to the batch size of the input image data to be processed, so that a dynamic distribution may be achieved, and the data may be processed efficiently in parallel.

It may be understood that the processor core of the processor may be further used to execute a second number of tasks according to the data in the $1^{st}$-level high-speed dynamic random access memory.

It may be understood that the apparatus of processing the data in the present disclosure has been described above, and a method of processing data in the present disclosure will be described below.

Figure 3:
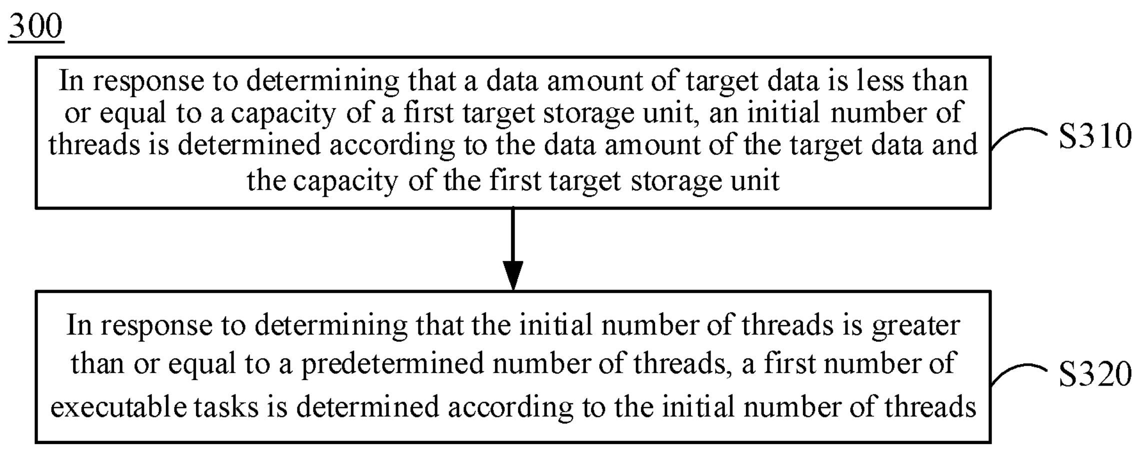
FIG. 3 shows a flowchart of a method of processing data according to an embodiment of the present disclosure.

FIG. 3 shows a flowchart of a method of processing data according to an embodiment of the present disclosure.

As shown in FIG. 3, a method 300 of processing data may include operation S310 to operation S320.

In operation S310, in response to determining that a data amount of target data is less than or equal to a capacity of a first target storage unit, an initial number of threads is determined according to the data amount of the target data and the capacity of the first target storage unit.

In embodiments of the present disclosure, the target data includes input data to be processed, weight data to be processed, and output data.

In operation S320, in response to determining that the initial number of threads is greater than or equal to a predetermined number of threads, a first number of executable tasks is determined according to the initial number of threads.

It may be understood that the method 300 may be performed using the above-mentioned processor 120.

In some embodiments, the method 300 may further include the following. A same number of data to be processed as the first number of executable tasks is written into the first target storage unit. For example, the data to be processed includes input data to be processed and weight data to be processed. A same number of tasks as the first number of executable tasks are executed in parallel to obtain a same number of output data as the first number of executable tasks. For example, the tasks may include processing the input data to be processed by using the weight data to be processed. The same number of output data as the first number of executable tasks is written into the first target storage unit.

In some embodiments, the capacity of the first target storage unit is less than or equal to the capacity of the second target storage unit.

In some embodiments, the method 300 may further include the following. A first number of tasks is determined according to an amount of resources required by the processor to process the target data, in response to determining that the initial number of threads is equal to the predetermined number of threads. A second number of executable tasks is determined according to the first number of tasks and the initial number of threads.

In some embodiments, the method 300 may further include the following. A same number of data to be processed as the initial number of threads is written into the first target storage unit. For example, the data to be processed includes input data to be processed and weight data to be processed. A same number of data to be processed as the first number of tasks is written into the second target storage unit. A same number of tasks as the second number of executable tasks are executed in parallel to obtain a same number of output data as the second number of executable tasks. For example, the tasks may include processing the input data to be processed by using the weight data to be processed. A same number of output data as the initial number of threads is written into the first target storage unit. A same number of output data as the first number of tasks is written into the second target storage unit.

In some embodiments, the method 300 may further include the following. A third number of executable tasks is determined according to the amount of resources required by the processor to process the target data, in response to determining that the data amount of the target data is greater than the capacity of the first target storage unit.

In some embodiments, the method 300 may further include the following. A same number of data to be processed as the third number of executable tasks is written into the second target storage unit. For example, the data to be processed includes input data to be processed and weight data to be processed. A same number of tasks as the third number of executable tasks are executed in parallel to obtain a same number of output data as the third number of executable tasks. For example, the tasks may include processing the input data to be processed by using the weight data to be processed. The same number of output data as the third number of executable tasks is written into the second target storage unit.

In some embodiments, the method 300 may further include the following. In response to determining that a sum of the data amount of the input data to be processed and the data amount of the output data is greater than the capacity of the first target storage unit, the input data to be processed is split into a plurality of input sub-data to be processed. A fourth number of executable tasks is determined according to the amount of resources required by the processor to process the input sub-data to be processed.

In some embodiments, the method 300 may further include the following. The weight data to be processed and a same number of input sub-data to be processed as the fourth number of executable tasks are written into the second target storage unit. A same number of tasks as the fourth number of executable tasks are executed in parallel to obtain a same number of output sub-data as the fourth number of executable tasks. For example, the tasks may include processing the input sub-data to be processed by using the weight data to be processed. The same number of output sub-data as the fourth number of executable tasks is written into the second target storage unit. A plurality of output sub-data are concatenated into output data.

Figure 4:
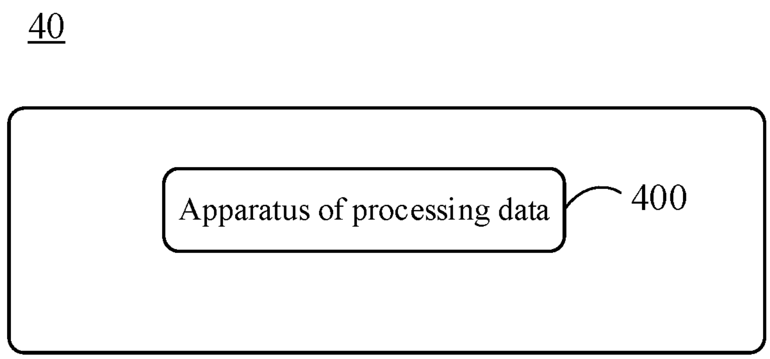
FIG. 4 shows a schematic block diagram of an electronic device according to an embodiment of the present disclosure.

FIG. 4 shows a block diagram of an electronic device according to an embodiment of the present disclosure.

As shown in FIG. 4, a device 40 may include an apparatus 400 of processing data provided in the present disclosure. For example, the apparatus 400 of processing the data may be the above-mentioned apparatus 100 of processing the data.

In technical solutions of the present disclosure, a collection, a storage, a use, a processing, a transmission, a provision, a disclosure, an application and other processing of user personal information involved comply with provisions of relevant laws and regulations, take essential confidentiality measures, and do not violate public order and good custom. In the technical solution of the present disclosure, authorization or consent is obtained from the user before the user's personal information is obtained or collected.

According to embodiments of the present disclosure, the present disclosure further provides an electronic device, a readable storage medium, and a computer program product.

Figure 5:
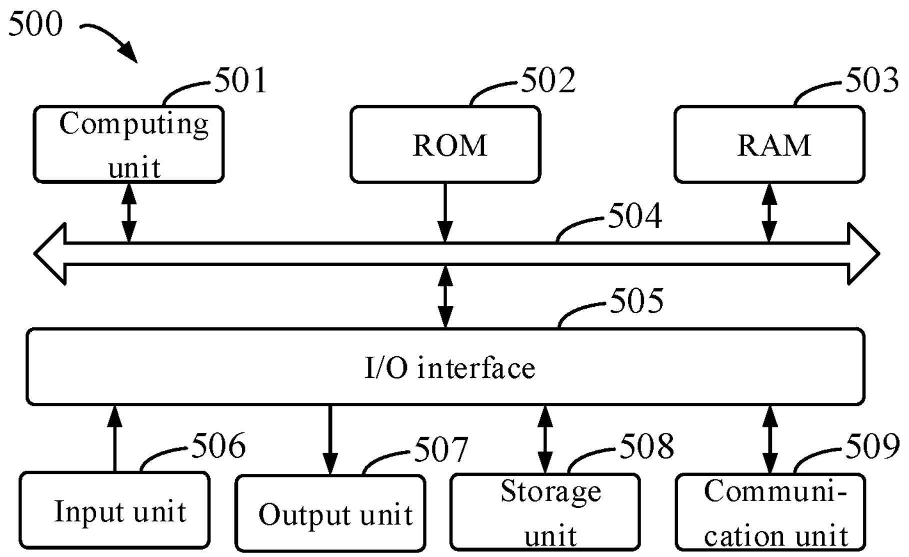
FIG. 5 shows a block diagram of an electronic device to which a method of processing data may be applied according to an embodiment of the present disclosure.

FIG. 5 shows a schematic block diagram of an example electronic device 500 for implementing embodiments of the present disclosure. The electronic device is intended to represent various forms of digital computers, such as a laptop computer, a desktop computer, a workstation, a personal digital assistant, a server, a blade server, a mainframe computer, and other suitable computers. The electronic device may further represent various forms of mobile devices, such as a personal digital assistant, a cellular phone, a smart phone, a wearable device, and other similar computing devices. The components as illustrated herein, and connections, relationships, and functions thereof are merely examples, and are not intended to limit the implementation of the present disclosure described and/or required herein.

As shown in FIG. 5, the electronic device 500 includes a computing unit 501 which may perform various appropriate actions and processes according to a computer program stored in a read only memory (ROM) 502 or a computer program loaded from a storage unit 508 into a random access memory (RAM) 503. In the RAM 503, various programs and data necessary for an operation of the electronic device 500 may also be stored. The computing unit 501, the ROM 502 and the RAM 503 are connected to each other through a bus 504. An input/output (I/O) interface 505 is also connected to the bus 504.

A plurality of components in the electronic device 500 are connected to the I/O interface 505, including: an input unit 506, such as a keyboard, or a mouse; an output unit 507, such as displays or speakers of various types; a storage unit 508, such as a disk, or an optical disc; and a communication unit 509, such as a network card, a modem, or a wireless communication transceiver. The communication unit 509 allows the electronic device 500 to exchange information/data with other devices through a computer network such as Internet and/or various telecommunication networks.

The computing unit 501 may be various general-purpose and/or dedicated processing assemblies having processing and computing capabilities. Some examples of the computing units 501 include, but are not limited to, a central processing unit (CPU), a graphics processing unit (GPU), various dedicated artificial intelligence (AI) computing chips, various computing units that run machine learning model algorithms, a digital signal processing processor (DSP), and any suitable processor, controller, microcontroller, etc. The computing unit 501 executes various methods and processes described above, such as the method of processing the data. For example, in some embodiments, the method of processing the data may be implemented as a computer software program which is tangibly embodied in a machine-readable medium, such as the storage unit 508. In some embodiments, the computer program may be partially or entirely loaded and/or installed in the electronic device 500 via the ROM 502 and/or the communication unit 509. The computer program, when loaded in the RAM 503 and executed by the computing unit 501, may execute one or more steps in the method of processing the data described above. Alternatively, in other embodiments, the computing unit 501 may be used to perform the method of processing the data by any other suitable means (e.g., by means of firmware).

Various embodiments of the systems and technologies described herein may be implemented in a digital electronic circuit system, an integrated circuit system, a field programmable gate array (FPGA), an application specific integrated circuit (ASIC), an application specific standard product (ASSP), a system on chip (SOC), a complex programmable logic device (CPLD), a computer hardware, firmware, software, and/or combinations thereof. These various embodiments may be implemented by one or more computer programs executable and/or interpretable on a programmable system including at least one programmable processor. The programmable processor may be a dedicated or general-purpose programmable processor, which may receive data and instructions from a storage system, at least one input device and at least one output device, and may transmit the data and instructions to the storage system, the at least one input device, and the at least one output device.

Program codes for implementing the methods of the present disclosure may be written in one programming language or any combination of more programming languages. These program codes may be provided to a processor or controller of a general-purpose computer, a dedicated computer or other programmable data processing apparatus, such that the program codes, when executed by the processor or controller, cause the functions/operations specified in the flowcharts and/or block diagrams to be implemented. The program codes may be executed entirely on a machine, partially on a machine, partially on a machine and partially on a remote machine as a stand-alone software package or entirely on a remote machine or server.

In the context of the present disclosure, a machine-readable medium may be a tangible medium that may contain or store a program for use by or in connection with an instruction execution system, an apparatus or a device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any suitable combination of the above. More specific examples of the machine-readable storage medium may include an electrical connection based on one or more wires, a portable computer disk, a hard disk, a random access memory (RAM), a read only memory (ROM), an erasable programmable read only memory (EPROM or a flash memory), an optical fiber, a compact disk read only memory (CD-ROM), an optical storage device, a magnetic storage device, or any suitable combination of the above.

In order to provide interaction with the user, the systems and technologies described here may be implemented on a computer including a display device (for example, a CRT (cathode ray tube) display or LCD (liquid crystal display)) for displaying information to the user, and a keyboard and a pointing device (for example, a mouse or a trackball) through which the user may provide the input to the computer. Other types of devices may also be used to provide interaction with the user. For example, a feedback provided to the user may be any form of sensory feedback (for example, visual feedback, auditory feedback, or tactile feedback), and the input from the user may be received in any form (including acoustic input, voice input or tactile input).

The systems and technologies described herein may be implemented in a computing system including back-end components (for example, a data server), or a computing system including middleware components (for example, an application server), or a computing system including front-end components (for example, a user computer having a graphical user interface or web browser through which the user may interact with the implementation of the system and technology described herein), or a computing system including any combination of such back-end components, middleware components or front-end components. The components of the system may be connected to each other by digital data communication (for example, a communication network) in any form or through any medium. Examples of the communication network include a local area network (LAN), a wide area network (WAN), and the Internet.

A computer system may include a client and a server. The client and the server are generally far away from each other and usually interact through a communication network. A relationship between the client and the server is generated through computer programs running on the corresponding computers and having a client-server relationship with each other. The server may be a cloud server, a server for a distributed system, or a server combined with a blockchain.

It should be understood that steps of the processes illustrated above may be reordered, added or deleted in various manners. For example, the steps described in the present disclosure may be performed in parallel, sequentially, or in a different order, as long as a desired result of the technical solution of the present disclosure may be achieved. This is not limited in the present disclosure.

The above-mentioned specific embodiments do not constitute a limitation on the scope of protection of the present disclosure. Those skilled in the art should understand that various modifications, combinations, sub-combinations and substitutions may be made according to design requirements and other factors. Any modifications, equivalent replacements and improvements made within the spirit and principles of the present disclosure shall be contained in the scope of protection of the present disclosure.

What is claimed is:

1. An apparatus of processing data, the apparatus comprising:

a first target storage unit;

a second target storage unit, wherein a capacity of the second target storage unit is greater than a capacity of the first target storage unit; and a processor configured to:

determine an initial number of threads according to a data amount of target data and the capacity of the first target storage unit in response to determining that the data amount of the target data is less than or equal to the capacity of the first target storage unit, wherein the target data comprises input data to be processed, weight data to be processed, and output data;

determine a first number of executable tasks according to the initial number of threads in response to determining that the initial number of threads is greater than or equal to a predetermined number of threads;

determine a first number of tasks according to an amount of resources required by the processor to process the target data, in response to determination that the initial number of threads is equal to the predetermined number of threads; and determine a second number of executable tasks according to the first number of tasks and the initial number of threads.

2. The apparatus according to claim 1, wherein the processor is further configured to:

write a same number of data to be processed as the first number of executable tasks into the first target storage unit, wherein the data to be processed comprises the input data to be processed and the weight data to be processed;

execute a same number of tasks as the first number of executable tasks in parallel to obtain a same number of output data as the first number of executable tasks, wherein the tasks comprise processing the input data to be processed by using the weight data to be processed; and write the same number of output data as the first number of executable tasks into the first target storage unit.

3. The apparatus according to claim 1, wherein the processor is further configured to:

write a same number of data to be processed as the initial number of threads into the first target storage unit, wherein the data to be processed comprises the input data to be processed and the weight data to be processed;

write a same number of data to be processed as the first number of tasks into the second target storage unit;

execute a same number of tasks as the second number of executable tasks in parallel to obtain a same number of output data as the second number of executable tasks, wherein the tasks comprise processing the input data to be processed by using the weight data to be processed;

write a same number of output data as the initial number of threads into the first target storage unit; and write a same number of output data as the first number of tasks into the second target storage unit.

4. The apparatus according to claim 1, wherein the processor is further configured to determine a third number of executable tasks according to the amount of resources required by the processor to process the target data, in response to determining that the data amount of the target data is greater than the capacity of the first target storage unit.

5. The apparatus according to claim 4, wherein the processor is further configured to:

write a same number of data to be processed as the third number of executable tasks into the second target storage unit, wherein the data to be processed comprises the input data to be processed and the weight data to be processed;

execute a same number of tasks as the third number of executable tasks in parallel to obtain a same number of output data as the third number of executable tasks, wherein the tasks comprise processing of the input data to be processed by using the weight data to be processed; and write the same number of output data as the third number of executable tasks into the second target storage unit.

6. The apparatus according to claim 1, wherein the processor is further configured to:

split the input data to be processed into a plurality of input sub-data to be processed in response to determining that a sum of a data amount of the input data to be processed and a data amount of the output data is greater than the capacity of the first target storage unit; and determine a fourth number of executable tasks according to an amount of resources required by the processor to process the input sub-data to be processed.

7. The apparatus according to claim 6, wherein the processor is configured to:

write the weight data to be processed and a same number of input sub-data to be processed as the fourth number of executable tasks into the second target storage unit;

execute a same number of tasks as the fourth number of executable tasks in parallel to obtain a same number of output sub-data as the fourth number of executable tasks, wherein the tasks comprise processing the input sub-data to be processed by using the weight data to be processed;

write the same number of output sub-data as the fourth number of executable tasks into the second target storage unit; and concatenate a plurality of output sub-data into output data.

8. A method of processing data, the method comprising:

determining an initial number of threads according to a data amount of target data and a capacity of a first target storage unit in response to determining that the data amount of the target data is less than or equal to the capacity of the first target storage unit, wherein the target data comprises input data to be processed, weight data to be processed, and output data and wherein the capacity of the first target storage unit is less than or equal to a capacity of a second target storage unit;

determining a first number of executable tasks according to the initial number of threads in response to determining that the initial number of threads is greater than or equal to a predetermined number of threads;

determining a first number of tasks according to an amount of resources required by the processor to process the target data, in response to determining that the initial number of threads is equal to the predetermined number of threads; and determining a second number of executable tasks according to the first number of tasks and the initial number of threads.

9. The method according to claim 8, further comprising:

writing a same number of data to be processed as the first number of executable tasks into the first target storage unit, wherein the data to be processed comprises the input data to be processed and the weight data to be processed;

executing a same number of tasks as the first number of executable tasks in parallel to obtain a same number of output data as the first number of executable tasks, wherein the tasks comprise processing the input data to be processed by using the weight data to be processed; and writing the same number of output data as the first number of executable tasks into the first target storage unit.

10. The method according to claim 8, further comprising:

writing a same number of data to be processed as the initial number of threads into the first target storage unit, wherein the data to be processed comprises the input data to be processed and the weight data to be processed;

writing a same number of data to be processed as the first number of tasks into the second target storage unit;

executing a same number of tasks as the second number of executable tasks in parallel to obtain a same number of output data as the second number of executable tasks, wherein the tasks comprise processing the input data to be processed by using the weight data to be processed;

writing a same number of output data as the initial number of threads into the first target storage unit; and writing a same number of output data as the first number of tasks into the second target storage unit.

11. The method according to claim 8, further comprising determining a third number of executable tasks according to the amount of resources required by the processor to process the target data, in response to determining that the data amount of the target data is greater than the capacity of the first target storage unit.

12. The method according to claim 11, further comprising:

writing a same number of data to be processed as the third number of executable tasks into the second target storage unit, wherein the data to be processed comprises the input data to be processed and the weight data to be processed;

executing a same number of tasks as the third number of executable tasks in parallel to obtain a same number of output data as the third number of executable tasks, wherein the tasks comprise processing the input data to be processed by using the weight data to be processed; and writing the same number of output data as the third number of executable tasks into the second target storage unit.

13. The method according to claim 8, further comprising:

splitting the input data to be processed into a plurality of input sub-data to be processed in response to determining that a sum of a data amount of the input data to be processed and a data amount of the output data is greater than the capacity of the first target storage unit; and determining a fourth number of executable tasks according to an amount of resources required by the processor to process the input sub-data to be processed.

14. The method according to claim 13, further comprising:

writing the weight data to be processed and a same number of input sub-data to be processed as the fourth number of executable tasks into the second target storage unit;

executing a same number of tasks as the fourth number of executable tasks in parallel to obtain a same number of output sub-data as the fourth number of executable tasks, wherein the tasks comprise processing the input sub-data to be processed by using the weight data to be processed;

writing the same number of output sub-data as the fourth number of executable tasks into the second target storage unit; and concatenating a plurality of output sub-data into output data.

15. An electronic device comprising the apparatus according to claim 1.

16. An electronic device comprising the apparatus according to claim 2.

17. An electronic device comprising the apparatus according to claim 3.

18. An electronic device comprising the apparatus according to claim 4.

19. An electronic device comprising the apparatus according to claim 5.

20. A non-transitory computer-readable storage medium having computer instructions therein, the computer instructions, when executed by a computer system, configured to cause the computer system to at least:

determine an initial number of threads according to a data amount of target data and a capacity of a first target storage unit in response to determining that the data amount of the target data is less than or equal to the capacity of the first target storage unit, wherein the target data comprises input data to be processed, weight data to be processed, and output data and wherein the capacity of the first target storage unit is less than or equal to a capacity of a second target storage unit;

determine a first number of executable tasks according to the initial number of threads in response to determining that the initial number of threads is greater than or equal to a predetermined number of threads;

determine a first number of tasks according to an amount of resources required by the processor to process the target data, in response to determining that the initial number of threads is equal to the predetermined number of threads; and determine a second number of executable tasks according to the first number of tasks and the initial number of threads.

* * * * *